United States Patent
Wrobel

(10) Patent No.: US 11,485,350 B2
(45) Date of Patent: Nov. 1, 2022

(54) SYSTEMS AND METHODS FOR ACCESSORY LOAD ADJUSTMENT TO REDUCE ENGINE NOISE

(71) Applicant: TOYOTA MOTOR ENGINEERING & MANUFACTURING NORTH AMERICA, INC., Plano, TX (US)

(72) Inventor: Shannon Alicia Wrobel, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 302 days.

(21) Appl. No.: 16/914,144

(22) Filed: Jun. 26, 2020

(65) Prior Publication Data

US 2021/0402975 A1    Dec. 30, 2021

(51) Int. Cl.
| | | |
|---|---|---|
| *B60W 10/30* | (2006.01) | |
| *B60W 20/13* | (2016.01) | |
| *B60H 1/32* | (2006.01) | |
| *B60W 10/08* | (2006.01) | |
| *B60W 20/17* | (2016.01) | |

(52) U.S. Cl.
CPC .......... *B60W 20/13* (2016.01); *B60H 1/3204* (2013.01); *B60W 10/08* (2013.01); *B60W 10/30* (2013.01); *B60W 20/17* (2016.01); *B60W 2510/0604* (2013.01); *B60W 2510/242* (2013.01); *B60W 2540/00* (2013.01); *B60W 2540/10* (2013.01); *B60W 2710/08* (2013.01); *B60W 2710/30* (2013.01)

(58) Field of Classification Search
CPC ...... B60W 20/13; B60W 10/08; B60W 10/30; B60W 2510/242; B60W 20/17; B60W 30/1886; B60W 2030/206; B60W 2510/0604; B60W 2540/10; B60W 2540/103; B60W 2710/30; B60W 1710/08
USPC ....................................................... 701/111
See application file for complete search history.

(56) References Cited

U.S. PATENT DOCUMENTS

| | | | |
|---|---|---|---|
| 2007/0255488 A1 | 11/2007 | Okubo | |
| 2008/0306670 A1 | 12/2008 | Masterson | |
| 2012/0184405 A1 | 7/2012 | Morimura | |
| 2020/0010089 A1* | 1/2020 | Ford | ...................... B60W 10/10 |

(Continued)

FOREIGN PATENT DOCUMENTS

| | | | | |
|---|---|---|---|---|
| DE | 102012211196 A1 * | 1/2014 | ................ | B60L 1/08 |
| WO | 2018182608 A1 | 10/2018 | | |

*Primary Examiner* — Roger L Pang
(74) *Attorney, Agent, or Firm* — Sheppard, Mullin, Richter & Hampton LLP; Hector A. Agdeppa; Daniel N. Yannuzzi

(57) ABSTRACT

Systems and methods are provided for controlling a hybrid powertrain of a hybrid vehicle, and may include: determining a value of a drive request for a combustion engine of the hybrid vehicle; determining electrical loading on batteries of the hybrid vehicle; adjusting operation of an accessory of the hybrid vehicle to reduce the electrical load of that accessory on the batteries of the hybrid vehicle when the drive request value is above a determined drive request threshold amount and the electrical loading on batteries of the hybrid vehicle is above a power loading threshold; and directing at least some of the power saved by adjusting operation of the accessory from the batteries of the hybrid vehicle to a drive motor of the hybrid vehicle to provide motive force for the vehicle.

22 Claims, 6 Drawing Sheets

(56) References Cited

U.S. PATENT DOCUMENTS

| | | | |
|---|---|---|---|
| 2020/0207326 A1* | 7/2020 | Wenger | B60H 1/00771 |
| 2021/0078567 A1* | 3/2021 | Ogawa | B60W 10/06 |
| 2022/0144243 A1* | 5/2022 | Jeong | B60W 10/26 |

* cited by examiner

SYSTEMS AND METHODS FOR ACCESSORY LOAD ADJUSTMENT TO REDUCE ENGINE NOISE

TECHNICAL FIELD

The present disclosure relates generally to hybrid electric vehicles, and in particular, some implementations may relate to reducing accessory loading to reduce engine noise.

DESCRIPTION OF RELATED ART

High fuel prices, concerns over the environment, concerns over dependence on foreign oil, carpool lane opportunities and a strict regulatory climate (e.g., CAFE standards) have led to a dramatic increase in the popularity of hybrid electric vehicles (HEVs). HEVs typically rely on a combination of electric motors and an internal combustion engine (ICE) to provide motive power for the vehicle, although other hybrid types are available. There are many different types of hybrid vehicles including, for example, full hybrid electric vehicles (FHEV), mild hybrid electric vehicles, and plug-in hybrid electric vehicles (PHEV).

The FHEV can run on just the combustion engine (powered by diesel or gasoline), the electric motor(s) (power from batteries), or a combination of the foregoing. The FHEV can be charged by electricity generated from the combustion engine or by regenerative braking. The FHEV typically is not plugged in to be recharged.

A mild hybrid has both one or more electric motors and a combustion engine. Unlike the FHEV, the mild hybrid vehicle cannot be run using one of these sources of motive power alone. They are always run in combination and work together.

A PHEV can be plugged in to an AC mains supply to recharge the batteries. The PHEV typically operates as a full hybrid vehicle, in that it can be operated using the electric motor(s) alone, the combustion engine alone, or a combination of the 2 in parallel.

Noise, vibration and harshness (NVH) is often considered a quality factor of a vehicle as it often determines what consumers think or how they feel about the vehicle. Accordingly, NVH can affect purchasing decisions as well as the amount someone is willing to pay for a vehicle. Engine vibration and engine noise can diminish the vehicle experience because it may impact on driver and passenger comfort, driver fatigue and vehicle durability (at least in the case of vibrations).

In terms of NVH, internal combustion engines tend to be more noticeable and intrusive than electric motors. Noise and vibration are ordinary byproducts of the combustion process, which relies on a series of explosions in the combustion chambers of the cylinders to propel the vehicle. While the 45° V-8 engine and the in-line 6 are generally considered to be inherently balanced engines, even those power plants are a source of noise and vibration. Vehicle designers have implemented a number of systems to reduce the NVH associated with internal combustion engines, including, for example, mufflers to quiet the exhaust noise, flexible engine and transmission mounts to isolate vibration, the addition of sound insulation materials to isolate the cabin, harmonic balancers to balance the crankshaft, counterrotating balance shafts, and in-cabin noise cancellation systems. However, even with the systems in place, the internal combustion engine can still be a source of unwanted cabin noise and vibration.

BRIEF SUMMARY OF THE DISCLOSURE

According to various embodiments of the disclosed technology a method of controlling a hybrid powertrain of a hybrid vehicle may include: determining a value of a drive request for a combustion engine of the hybrid vehicle; determining electrical loading on batteries of the hybrid vehicle; adjusting operation of an accessory of the hybrid vehicle to reduce the electrical load of that accessory on the batteries of the hybrid vehicle when the drive request value may be above a determined drive request threshold amount and the electrical loading on batteries of the hybrid vehicle may be above a power loading threshold; and directing at least some of the power saved by adjusting operation of the accessory from the batteries of the hybrid vehicle to a drive motor of the hybrid vehicle to provide motive force for the vehicle. The drive request may include at least one of a throttle request, a drive force request and a torque request.

Adjusting operation of the accessory may include inhibiting operation of a compressor, a thermoelectric heating or cooling element or a resistive heating element of a climate control system of the vehicle. The method may include maintaining a blower motor speed of the climate control at a level corresponding to a user setting for the blower motor speed.

The power loading threshold may be determined based on an amount of power intended to be directed to the drive motor of the hybrid vehicle to provide motive force for the hybrid vehicle.

The power loading threshold may be a dynamic threshold that varies based on the amount of power intended to be directed to the drive motor of the hybrid vehicle to provide motive force for the hybrid vehicle.

The drive request threshold may be determined based on an amount of noise caused by the combustion engine of the hybrid vehicle at a given drive force request level.

The method may further include receiving sensor data indicating vehicle parameters and using the received sensor data to determine whether to adjust operation of an accessory of the hybrid vehicle. The vehicle parameters may include cabin temperature of the hybrid vehicle and a temperature set point of a climate control system of the hybrid vehicle.

The method may further include not adjusting operation of the climate control system to reduce its electrical load on the batteries of the hybrid vehicle when the temperature set point may be greater than a determined amount above or below the cabin temperature of the hybrid vehicle.

Adjusting operation of an accessory of the hybrid vehicle to reduce the electrical load of that accessory on the batteries of the hybrid vehicle when the drive request value may be above a determined drive request threshold amount and the electrical loading on batteries of the hybrid vehicle may be above a power loading threshold, may include only adjusting the operation of an accessory of the hybrid vehicle when the drive request value may be above a determined drive request threshold amount fora predetermined period of time.

A system for controlling a hybrid powertrain of a hybrid vehicle comprising, may include: a processor; and a memory coupled to the processor to store instructions, which when executed by the processor, cause the processor to perform operations, the operations comprising determining a value of a drive request for a combustion engine of the hybrid vehicle; determining electrical loading on batteries of the hybrid vehicle; adjusting operation of an accessory of the hybrid vehicle to reduce the electrical load of that accessory on the batteries of the hybrid vehicle when the drive request value may be above a determined drive request threshold amount and the electrical loading on batteries of the hybrid vehicle may be above a power loading threshold; and directing at least some of the power saved by adjusting operation of the accessory from the batteries of the hybrid vehicle to a drive motor of the hybrid vehicle to provide motive force for the vehicle. The drive request may include at least one of a throttle request, a drive force request and a torque request.

Adjusting operation of the accessory may include inhibiting operation of a compressor, a thermoelectric heating or cooling element or a resistive heating element of a climate control system of the vehicle.

The operations may further include maintaining a blower motor speed of the climate control at a level corresponding to a user setting for the blower motor speed.

The power loading threshold may be determined based on an amount of power intended to be directed to the drive motor of the hybrid vehicle to provide motive force for the hybrid vehicle. The power loading threshold may be a dynamic threshold that varies based on the amount of power intended to be directed to the drive motor of the hybrid vehicle to provide motive force for the hybrid vehicle.

The drive force threshold may be determined based on an amount of noise caused by the combustion engine of the hybrid vehicle at a given drive force request level.

The operations may further include receiving sensor data indicating vehicle parameters and using the received sensor data to determine whether to adjust operation of an accessory of the hybrid vehicle.

The vehicle parameters may include cabin temperature of the hybrid vehicle and a temperature set point of a climate control system of the hybrid vehicle. The operations may include not adjusting operation of the climate control system to reduce its electrical load on the batteries of the hybrid vehicle when the temperature set point may be greater than a determined amount above or below the cabin temperature of the hybrid vehicle.

Adjusting operation of an accessory of the hybrid vehicle to reduce the electrical load of that accessory on the batteries of the hybrid vehicle when the drive request value may be above a determined drive request threshold amount and the electrical loading on batteries of the hybrid vehicle may be above a power loading threshold, may include only adjusting the operation of an accessory of the hybrid vehicle when the drive request value may be above a determined drive request threshold amount fora predetermined period of time.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the systems and methods disclosed herein can provide mechanisms to control a hybrid powertrain to reduce engine noise, such as during high load operations like acceleration or hill climbing. In Hybrid vehicles engine noise gets louder during various conditions like acceleration and hill climbing. This can be compounded during certain conditions such as hot and cold temperatures, for example, because the accessory load of the vehicle's heating, ventilating and air conditioning (HVAC) system takes battery power that might otherwise be utilized for providing forward motive power.

Embodiments may be implemented to use more battery hybrid power to reduce the amount of engine power needed during high acceleration requests or heavy load events. This can be accomplished by reducing the amount of power required by vehicle accessories so that this power can be directed toward the vehicle drive motor (which can comprise one or more motors such as, e.g., motors 22 in the example of FIG. 1 or motors 108, 112 in the example of FIG. 2).

For example, in a condition in which the accessory load is high and the driver wants to accelerate quickly (e.g., as signaled by the driver pressing the accelerator over a threshold), the system may be configured to redirect a portion of the power going to the accessories to address the drive request. To accomplish this, the system may reduce the amount of load presented by the accessories so that the power may be redirected appropriately. For example, the system may be configured to turn off the air conditioning or heat pump compressor or disable resistive heating elements in the heating system, such that the HVAC system draws less power from the batteries. In some embodiments, the system can be configured to maintain the blower speed to make this transition less noticeable to the driver and passengers. After the driver has eased up on the accelerator (e.g., below a certain threshold) or depressed the brake pedal, the system can return the accessory power to normal.

Figure 1:
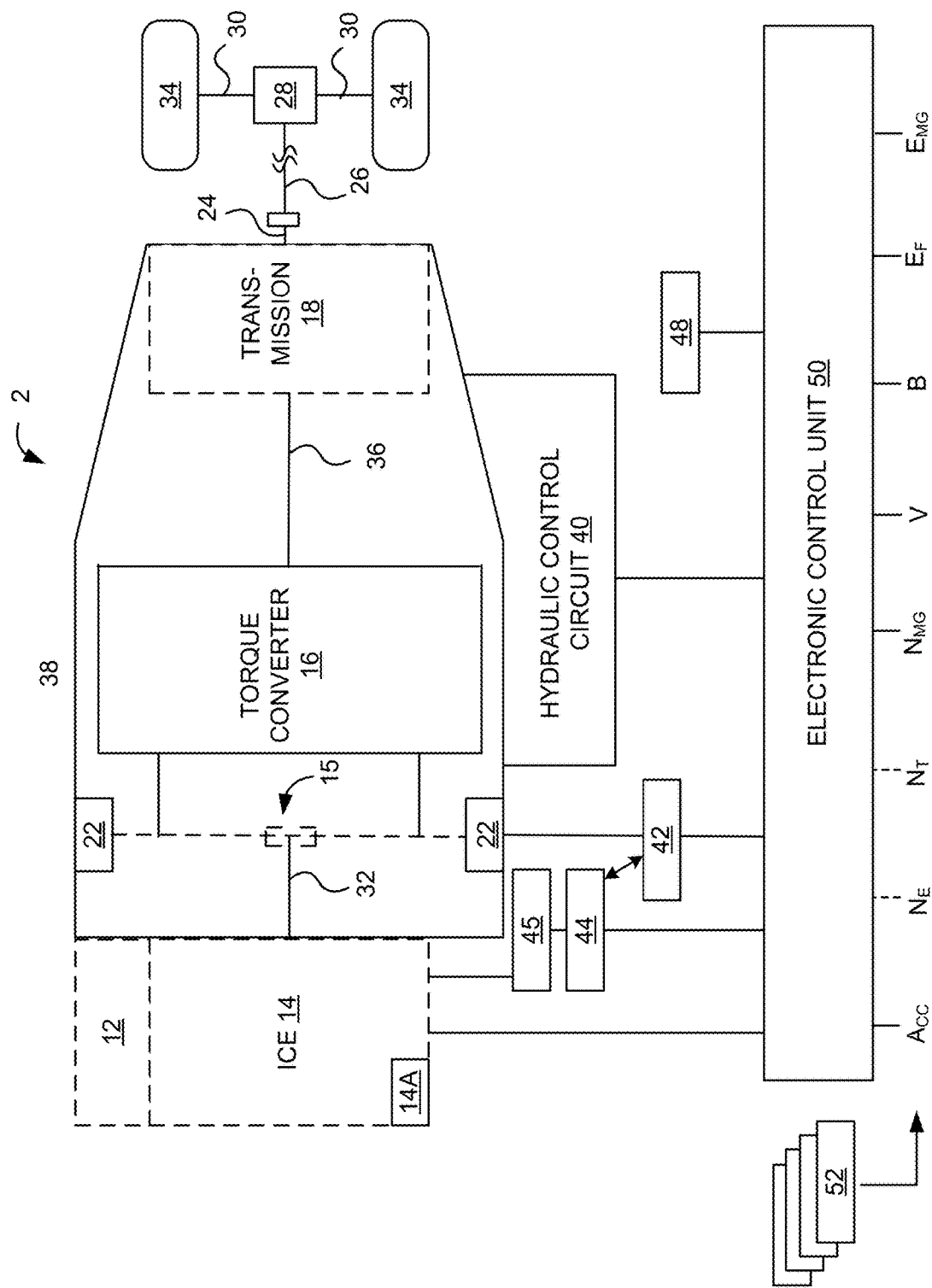
FIG. 1 is a schematic representation of an example hybrid vehicle with which embodiments of the systems and methods disclosed herein may be implemented.

The systems and methods disclosed herein may be implemented with any of a number of different vehicles and vehicle types. For example, the systems and methods disclosed herein may be used with automobiles, trucks, motorcycles, recreational vehicles and other like on-or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for managing engine noise can be implemented in other types of vehicle including gasoline- or diesel-powered vehicles, or other vehicles.

FIG. 1 illustrates a drive system of a vehicle 2 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 2 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine (ICE) such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, nickel-metal hydride batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 2 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 2. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 2 can include a plurality of sensors 52 that can be used to detect various conditions internal or external to the vehicle and provide sensed conditions to electronic control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
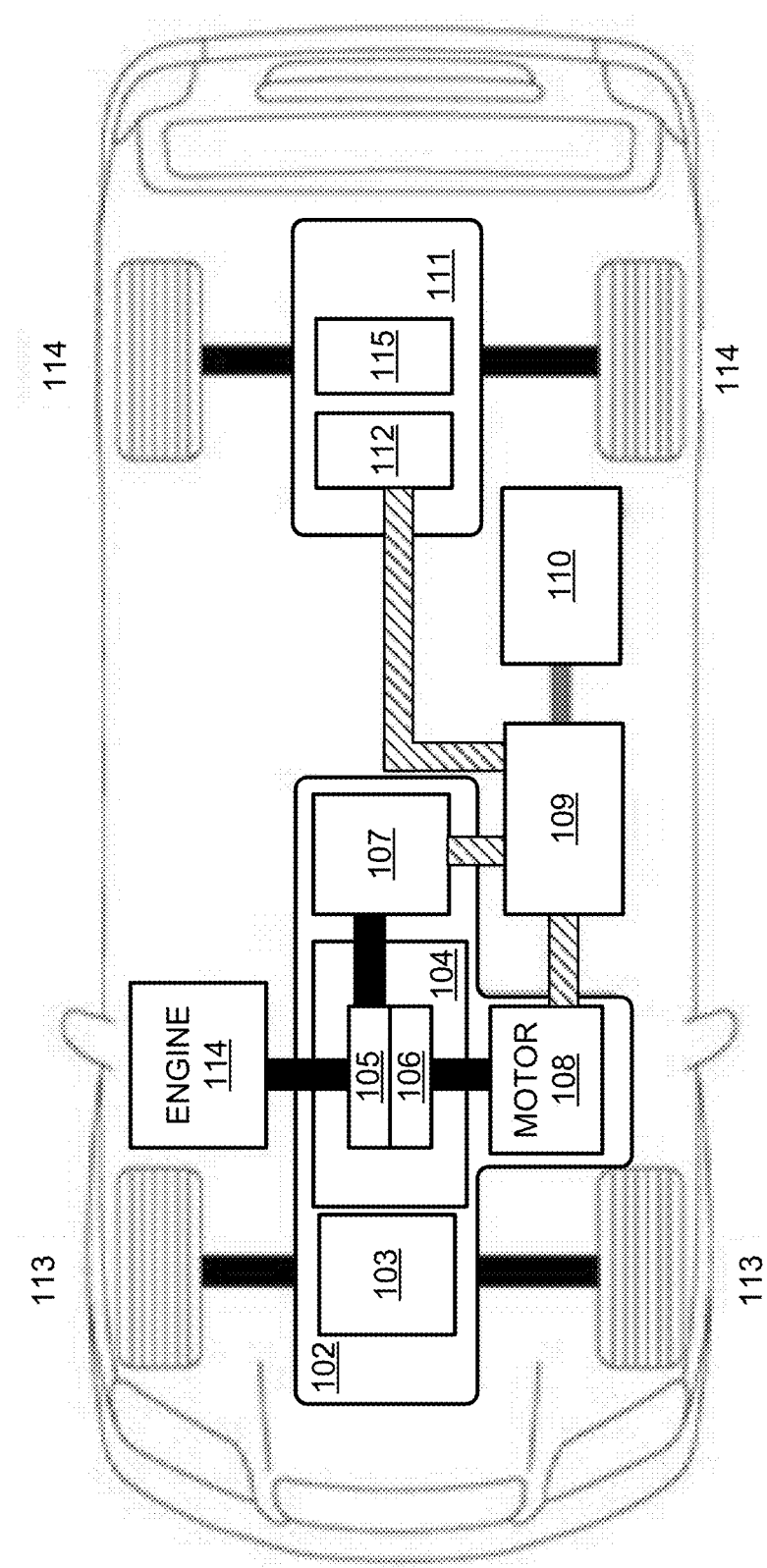
FIG. 2 is another example of a hybrid vehicle with which systems and methods disclosed herein may be implemented.

FIG. 2 is another example of a hybrid vehicle with which systems and methods disclosed herein may be implemented. The example illustrated in FIG. 2 is also that of a hybrid vehicle drive system of a vehicle 100 that may also include an engine 114 (e.g., engine 14) and one or more electric motors 108, 112 (e.g., motors 22) as sources of motive power. In this example, a hybrid transaxle 102 includes front differential 103, a compound gear unit 104, a motor 108, and a generator 107. Compound gear unit 104 includes a power split planetary gear unit 105 and a motor speed reduction planetary gear unit 106. This example vehicle 100 also includes front and rear drive motors 108, 112, an inverter with converter assembly 109, battery 110 (which may include one or more batteries), and a rear differential 115. Hybrid transaxle assembly 102 enables power from engine 101, motor 108, or both to be applied to front wheels 113 via front differential 103.

Inverter with converter assembly 109 inverts DC power from battery 110 to create AC power to drive AC motors 108, 112. In embodiments where motors 108, 112 are DC motors, no inverter is required. Inverter with converter assembly 109 also accepts power from generator 107 (e.g., during engine charging) and uses this power to charge batteries 110.

The examples of FIGS. 1 and 2 are provided for illustration purposes only as examples of vehicle systems with which embodiments of the disclosed technology may be implemented. One of ordinary skill in the art reading this description will understand how the disclosed embodiments can be implemented with vehicle platforms.

Figure 3:
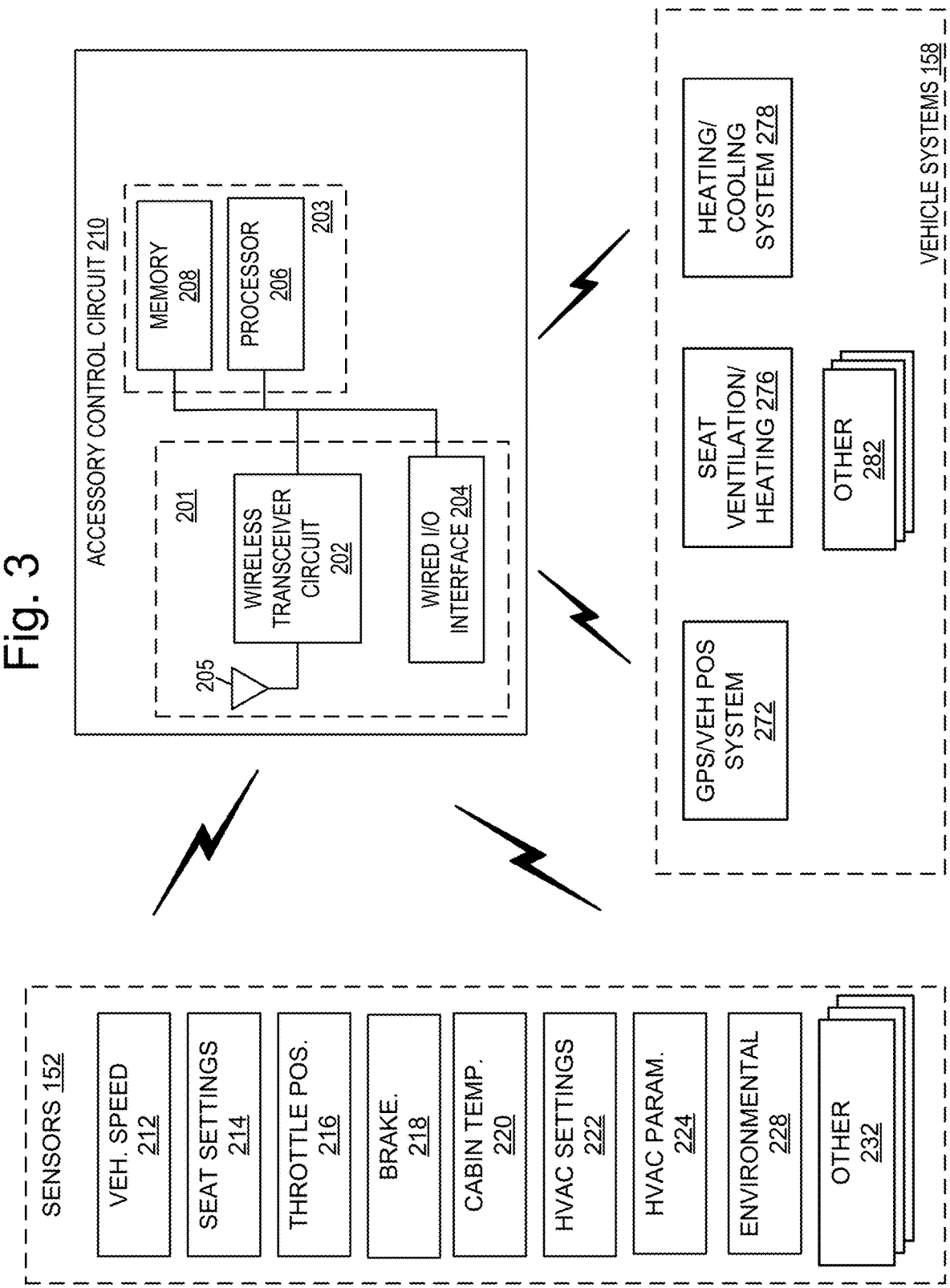
FIG. 3 illustrates an example architecture for providing accessory control in accordance with various embodiments of the systems and methods described herein.

FIG. 3 illustrates an example architecture for providing accessory control in accordance with one embodiment of the systems and methods described herein. Referring now to FIG. 3, in this example, the vehicle includes an accessory control circuit 210, a plurality of sensors 152 and a plurality of vehicle systems 158. Sensors 152 and vehicle systems 158 can communicate with accessory control circuit 210 via a wired or wireless communication interface. Although sensors 152 and vehicle systems 158 are depicted as communicating with accessory control circuit 210, they can also communicate with each other as well as with other vehicle systems, including vehicle systems 158. Accessory control circuit 210 can be implemented as an ECU or as part of an ECU such as, for example electronic control unit 50. In other embodiments, accessory control circuit 210 can be implemented independently of the ECU.

Accessory control circuit 210 in this example includes a communication circuit 201 and a decision circuit 203 (including a processor 206 and memory 208 in this example). Components of accessory control circuit 210 are illustrated as communicating with each other via a data bus, although other communication and interfaces can be included.

Processor 206 can include one or more GPUs, CPUs, microprocessors, or any other suitable processing system. Processor 206 may include a single core or multicore processors. The memory 208 may include one or more various forms of memory or data storage (e.g., flash, RAM, etc.) that may be used to store sensor data, instructions and variables for processor 206 as well as any other suitable information. Memory 208, can be made up of one or more modules of one or more different types of memory, and may be configured to store data and other information as well as operational instructions that may be used by the processor 206 to accessory control circuit 210.

Although the example of FIG. 3 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up an accessory control circuit 210.

Communication circuit 201 either or both a wireless transceiver circuit 202 with an associated antenna 205 and a wired I/O interface 204 with an associated hardwired data port (not illustrated). As this example illustrates, communications with accessory control circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 205 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by accessory control circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Sensors 152 can include, for example, sensors 52 such as those described above with reference to the example of FIG. 1. Sensors 152 can include additional sensors that may or may not otherwise be included on a standard vehicle 10 with which the accessory control system is implemented. In the illustrated example, sensors 152 include vehicle speed sensors 212, heated/ventilated seat settings sensors 214, throttle sensors 216, brake application sensors, cabin temperature 220, HVAC system setting sensors 222, HVAC parameter sensors 224, and environmental sensors 228 (e.g., to exterior temperature, whether or other environmental conditions). Additional sensors 232 can also be included as may be appropriate for a given implementation of the accessory control system.

Vehicle systems 158 can include any of a number of different vehicle components or subsystems used to control or monitor various aspects of the vehicle and its performance. In this example, the vehicle systems 158 include a GPS or other vehicle positioning system 272, seat heating and ventilation system 276, vehicle heating/cooling system 278, and other vehicle systems 282.

During operation, accessory control circuit 210 can receive information from various vehicle sensors to determine whether the system should adjust accessory power and the hybrid vehicle powertrain. Communication circuit 201 can be used to transmit and receive information between accessory control circuit 210 and sensors 152, and accessory control circuit 210 and vehicle systems 158. Also, sensors 152 may communicate with vehicle systems 158 directly or indirectly (e.g., via communication circuit 201 or otherwise).

In various embodiments, communication circuit 201 can be configured to receive data and other information from sensors 152 that is used in determining whether to adjust the operating parameters of one or more accessories to free additional battery power that can be used to operate the vehicle drive motor, which can comprise one or more motors. Additionally, communication circuit 201 can be used to send an activation signal or other activation information to various vehicle systems 158 to control the accessories and the hybrid vehicle powertrain. For example, as described in more detail below, communication circuit 201 can be used to send signals to one or more of: vehicle positioning system 272 (e.g., to reduce power drawn by the positioning system); seat ventilation and heating system 276 (e.g., to reduce or temporarily disable seat ventilation or heating to conserve power); the vehicle HVAC system 278 (e.g., to turn off the compressor, to turn off or reduce power to thermoelectric heating or cooling elements or resistive heating elements, or take other actions to reduce the power drawn by the HVAC system); or other accessory systems.

Other example accessories that may be adjusted or turned off to reduce the power drawn from the batteries may include, for example, a heated steering wheel, seat massagers, a cabin air diffuser, and a water pump (where implemented as an electric water pump). In various embodiments many other accessories may be turned off or adjusted to reduce their draw, however in some applications it may be desirable to turn off or adjust only those accessories whose adjustment won't be overly intrusive to the driver. For example, turning off the vehicle entertainment system solely for the purpose of reducing engine noise under load may be too intrusive or annoying to the vehicle occupants and its "cost" in that regard may outweigh the benefits.

In some embodiments, if the HVAC system is adjusted (e.g., the compressor temporarily halted) the system can be configured to allow the HVAC blower motor speed to remain at its then current setting so that any change to the HVAC system (e.g., shutting down the compressor) is not as noticeable to the driver. In other embodiments, the system can be configured to reduce the HVAC blower motor setting (i.e., reduce the fan speed) as well.

Figure 4:
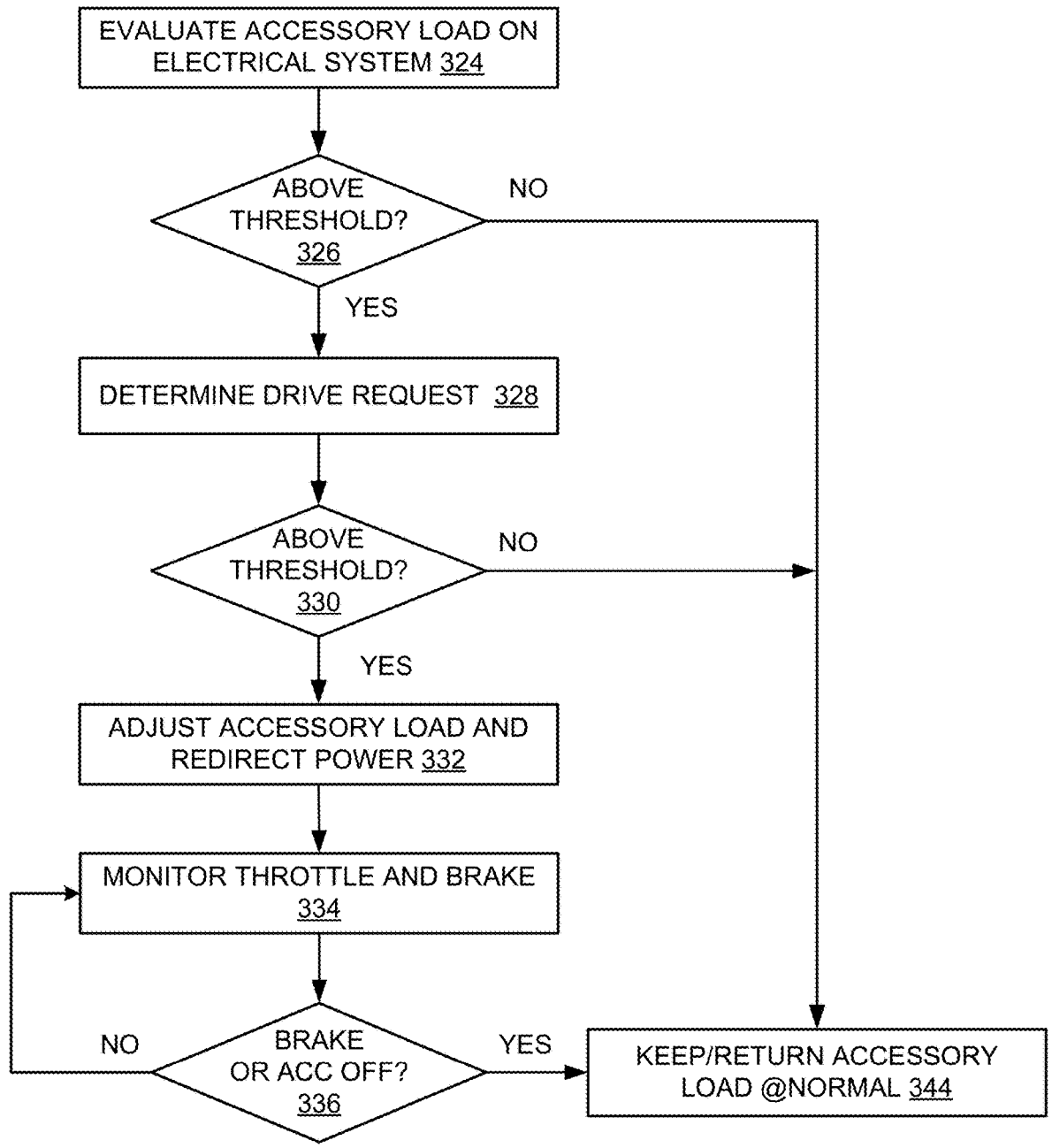
FIG. 4 is a diagram illustrating an example process for adjusting accessory load in accordance with various embodiments of the systems and methods described herein.

FIG. 4 is a diagram illustrating an example process for adjusting accessory load in accordance with various embodiments. Referring now to FIG. 4, at operation 324 the system evaluates the accessory load on the vehicle electrical system. Particularly, the system may be configured to evaluate the accessory load on (i.e., amount of power drawn from) the system batteries. For example, the system may be configured to monitor one or more vehicle sensors (e.g. sensors 152 or other sensors) to determine the power currently being drawn by one or more accessories. As noted above, the system may be configured to look at data or information from various accessories such as, for example, the vehicle HVAC system, heated/ventilated seats, heated steering wheel, and other accessories. Accordingly, the system can determine whether there are any accessories that may be adjusted to provide additional battery power to the drive motor (which may comprise one or more motors).

The system can also be configured to look at the overall load on the batteries to determine whether any adjustment needs to be made in order to provide power to the drive motor, or whether there is sufficient power available even with the current load to power the drive motor. Where there is already sufficient power available from the batteries to utilize the drive motor as may be desired for motive power, the system may be configured to not make or defer any adjustments to accessory operation. Accordingly, as illustrated operation 326 the system evaluates loading on the vehicle batteries to determine whether the loading is above a particular threshold. The threshold may be set, for example, at a level above which there is insufficient remaining battery power for the drive motor or below which there is sufficient remaining battery power to operate the drive motor.

As a more specific example, the threshold may be determined based on the amount of power required to operate the drive motor at a desired or requested level Because this amount of power may be determined by accelerator pedal travel or a drive force request, or other like information, such embodiments may gather this information to make this dynamic threshold determination. If a certain amount of battery power is required to operate the drive motor at a desired or intended amount of torque to supplement the engine to reduce noise, that required amount of battery power can be used as the threshold such that above the threshold there is less than this required amount of battery power remaining and below the threshold there is more than this required amount of battery power remaining. A cushion can be provided in the threshold setting to ensure with a determined margin that there is sufficient power available. There may be a sufficient amount of hysteresis built into the decision process to avoid the system cycling back and forth between decisions.

If at operation 326 it is determined that the load on the batteries is not above threshold (e.g., there is sufficient available power to operate the drive motor as desired), the system does not adjust the accessory settings as illustrated operation 344. This is because there is sufficient remaining battery power to supply the drive motor as needed. The system may continue to monitor the load on the batteries to determine whether it rises above the threshold.

If, on the other hand, the system determines at operation 326 that the load on the batteries is above threshold, the system can proceed to operation 328 where it determines a drive request. The system can use data representing factors such as at least one of throttle position, torque request, drive force request, percent of wide-open throttle (WOT) and so on to determine a level of drive request, which can be used to determine whether the vehicle is being asked operate at a level where NVH can be considered overly intrusive. This may occur, for example, during heavy acceleration, during passing maneuvers, during a WOT request, during hill climbing, or otherwise during periods where there is a high throttle request, a high drive force request or high torque request for the vehicle, and so on. This data can also be used to determine a desired level of motive force to be provided by the drive motor, which can be used for setting the threshold used at operation 326.

If at operation 330 the system determines that the drive request is not above a determined threshold, the system may be configured to not make or defer any adjustments to accessory operation. The system can continue to monitor battery loading and drive requests.

If, on the other hand, the system determines at operation 330 that the drive request is above a determined threshold, the system can proceed to operation 332 where it adjusts the accessory load and redirects power from the batteries to the drive motor. Data from sensors can be used to determine whether it is appropriate to adjust any accessory operation, and information obtained at operation 324, for example, may be used to determine whether such adjustments will yield benefit. Adjusting the accessory load may include, for example, disabling the HVAC compressor, disabling or reducing thermoelectric heating or cooling elements or resistive heating elements in the HVAC system, disabling or reducing operation of heated/ventilated seats and massage seats, disabling operation of an electric water pump (assuming engine block/coolant temperature is sufficiently low), and otherwise disabling or reducing operation of vehicle accessories.

The system can further be configured to redirect remaining power to the drive motor to allow for acceleration using motor assist or using only the drive motor.

In some embodiments, the system can be configured to require that the drive force request be above the determined threshold for a determined period of time before proceeding to operation 332. This can ensure that the high drive request is not the result of just a momentary stab at the accelerator pedal or other brief above-threshold request. This can be used to avoid situations in which the system makes accessory adjustments for only very short duration throttle actions. For example, embodiments may require that the drive request be above the determined threshold for a period of ½ second, one second, two seconds, three seconds, or other period of time.

The system may be configured to monitor a number of parameters before reaching the conclusion to adjust accessory operation. For example, the system may consider cabin temperature, weather, exterior temperature, entertainment system settings (e.g., volume), window status (e.g., open/closed), and other factors before determining whether or not to adjust operation of the climate control system. The system may compare climate control settings (e.g., set temp) with cabin temperature to determine whether it would be advised to disable or reduce the heating or cooling function. For example, the climate control system may be set for MAX A/C and the cabin temperature may be 110° F., 120° F., 125° F. or other high temperature (such as, for example, when the operator recently enters a parked car). In this case, the system may decide not to adjust the climate control system as the discomfort to the driver by the high temperature may be greater than the discomfort to the driver caused by engine noise.

As another example, a difference (e.g., in degrees) of the temperature set point for the climate control system and the then current cabin temperature might be greater than a determined temperature difference threshold, indicating that the full climate control operation might be important to the occupant(s) of the vehicle at that time. In this case, the system may decide not to adjust the climate control system as the discomfort to the driver by the large temperature differential may be greater than the discomfort to the driver caused by engine noise.

As another example of parameters that can be monitored, the system may evaluate sources of noise other than engine noise to determine whether to disable or reduce any accessories to provide power to the drive motor. For example, where fan settings on the climate control system are high, where the volume of the entertainment system is high, or where one or more windows are open, engine noise resulting from a high drive force request might not be heard or might be less noticeable over these other sources of noise. Accordingly, the system can be configured to disable accessory control in these circumstances.

The system may further be configured to use machine learning to determine an amount of savings that might be gained by disabling or cutting back on certain accessories or accessory features. For example, the system may gather data from a plurality of sensors, including, for example, accessory setting data (e.g., climate control temp settings, heated/ventilated seat settings, electric water pump on, etc.) and environmental data (e.g., cabin temperature, outside temperature, time of day, weather conditions (e.g., raining, cloudy or sunny), etc.) and other data. The machine learning model can be trained on this data with actual outcomes to build and refine a prediction model to predict the amount of power savings created by certain adjustments. The machine learning model can then be used to determine which changes to make to the accessories.

At operation 334, the system can continue to monitor drive requests and also monitor brake requests to determine whether the vehicle operator is continuing to operate the vehicle to result in a drive request above threshold. If at operation 336 it is determined that the operator lifted their foot off the throttle or applied the brakes, or if the drive request otherwise drops below threshold (in some applications, for a predetermined period of time), the system can return the accessory operation to "normal" (e.g., operation before the accessory or accessories were adjusted) and continue to monitor the various systems. If the operator continues to operate the vehicle in a manner that results in a high drive force request, operation continues.

Although the process illustrated in FIG. 4 illustrates evaluating the accessory load before evaluating the drive request, these operations could be reversed. The system can be configured to sense a drive request above threshold and upon sensing such request (in some cases, over a predetermined time), the system can evaluate the accessory load. In some implementations, the system may be configured to monitor drive requests and accessory loading simultaneously.

Figure 5:
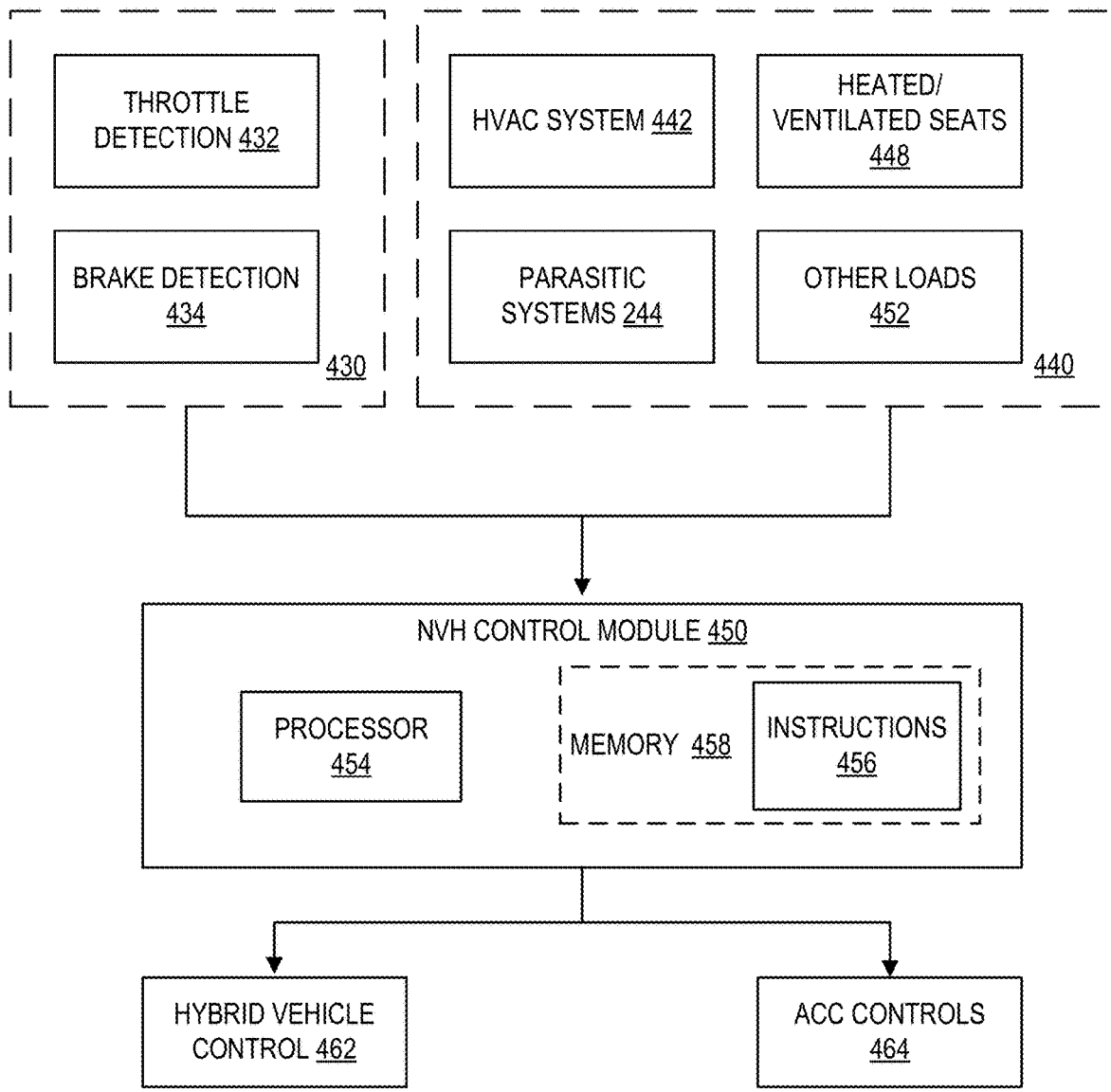
FIG. 5 is a diagram illustrating another example system for adjusting accessory operation in accordance with various embodiments.
Figure 6:
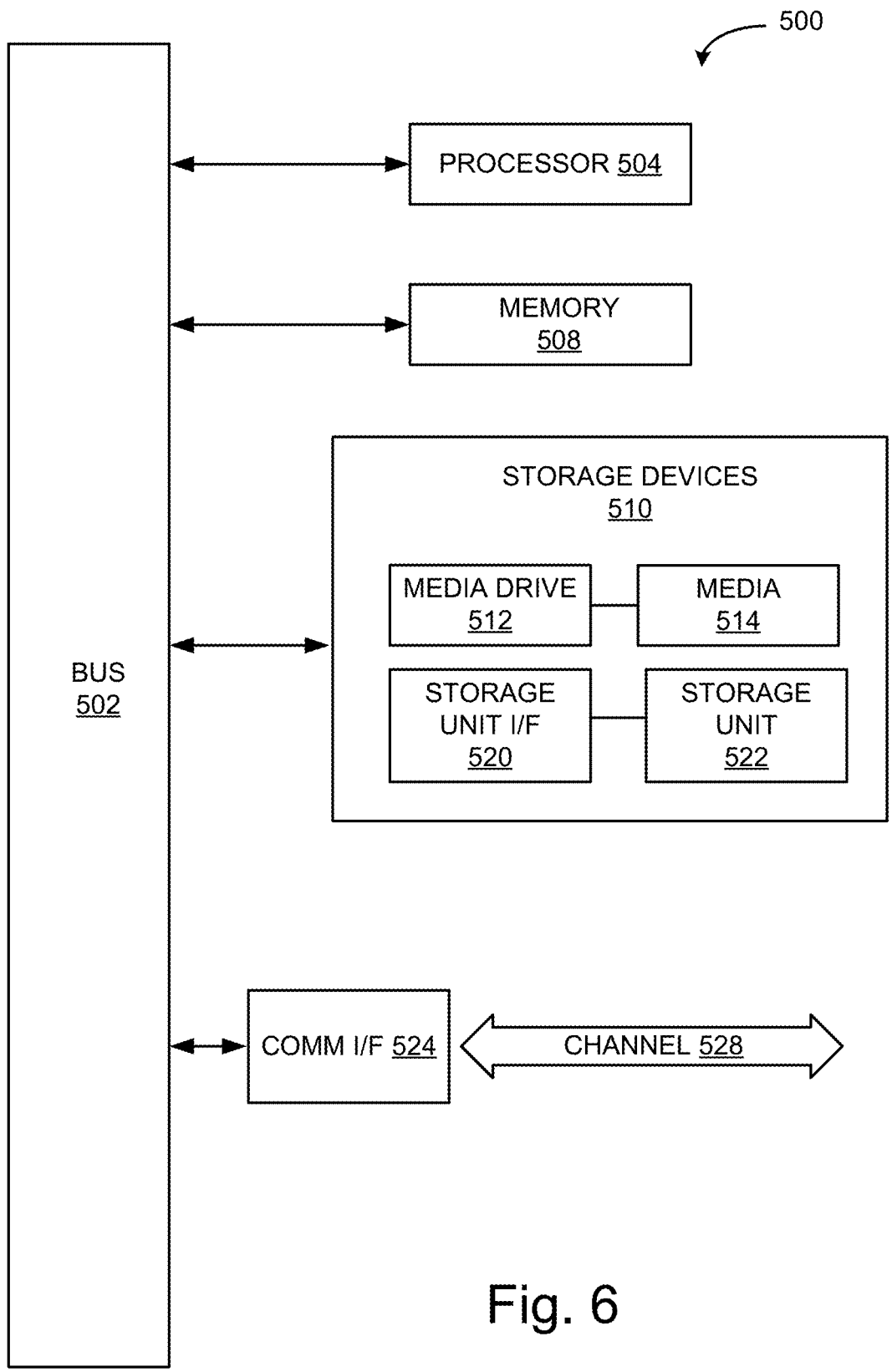
FIG. 6 is an example computing component that may be used to implement various features of embodiments described in the present disclosure.

FIG. 5 is a diagram illustrating another example system for adjusting accessory operation in accordance with various embodiments. Referring now to FIG. 5, in this example the NVH control module 450 (e.g., which may be implemented as accessory control circuit 210) receives input from vehicle drive systems 430 and vehicle load systems 440 assess the need to adjust accessory operation to allow motor assist or vehicle operation entirely using the drive motor. In this example, NVH control module 450 uses information from the throttle system 432 and the braking system 434 to determine drive force requests, and more particularly, to determine whether drive force requests are above a threshold.

In the illustrated example, NVH control module 450 includes a processor 454 and memory 458. Processor 454 can include one or more GPUs, CPUs, microprocessors or any other suitable processing system. Processor 454 may include one or more single core or multicore processors. Processor 454 executes instructions 456 stored in a non-transitory computer readable medium, such as memory 458.

Memory 458 may contain instructions (e.g., program logic) executable by processor 454 to execute various functions of the vehicle, including those of vehicle systems and subsystems. Memory 458 may contain additional instructions as well, including instructions to transmit data to, receive data from, interact with, and/or control one or more of sensors and vehicle systems. In addition to the instructions, memory 458 may store data and other information used by the vehicle and its systems and subsystems for operation, including operation of the vehicle.

NVH control module 450 uses information from accessories and other vehicle loads to determine the total current command on the vehicle batteries. The system can monitor various accessories and loads such as, for example, HVAC system 442, heated/ventilated seats 448, parasitic systems 444, and other loads and accessories 446. NVH control module 450 can use information from vehicle drive systems 430 and vehicle load systems 440 assess to determine whether it is desirable to supplement or replace the combustion engine with the drive motor, and if so, what accessory changes to be made. In some embodiments, this may be accomplished in accordance with the example process described above with reference to FIG. 4. Accordingly, NVH control module 450 can send commands to hybrid vehicle control systems 462 and accessory control systems 464 to adjust the accessories to reduce the amount of power drawn from the batteries by the accessories and to cause this power to be redirected from the batteries to the drive motor.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 450. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 450, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of controlling a hybrid powertrain of a hybrid vehicle comprising:
   determining a value of a drive request for a combustion engine of the hybrid vehicle;
   determining electrical loading on batteries of the hybrid vehicle;
   adjusting operation of an accessory of the hybrid vehicle to reduce the electrical load of that accessory on the batteries of the hybrid vehicle when the drive request value is above a determined drive request threshold amount and the electrical loading on batteries of the hybrid vehicle is above a power loading threshold; and
   directing at least some of the power saved by adjusting operation of the accessory from the batteries of the hybrid vehicle to a drive motor of the hybrid vehicle to provide motive force for the vehicle.

2. The method of claim 1, wherein the drive request comprises at least one of a throttle request, a drive force request and a torque request.

3. The method of claim 1, wherein adjusting operation of the accessory comprises inhibiting operation of a compressor, a thermoelectric heating or cooling element or a resistive heating element of a climate control system of the vehicle.

4. The method of claim 3, further comprising maintaining a blower motor speed of the climate control at a level corresponding to a user setting for the blower motor speed.

5. The method of claim 1, wherein the power loading threshold is determined based on an amount of power intended to be directed to the drive motor of the hybrid vehicle to provide motive force for the hybrid vehicle.

6. The method of claim 5, wherein the power loading threshold is a dynamic threshold that varies based on the amount of power intended to be directed to the drive motor of the hybrid vehicle to provide motive force for the hybrid vehicle.

7. The method of claim 1, wherein the drive request threshold is determined based on an amount of noise caused by the combustion engine of the hybrid vehicle at a given drive force request level.

8. The method of claim 1, further comprising receiving sensor data indicating vehicle parameters and using the received sensor data to determine whether to adjust operation of an accessory of the hybrid vehicle.

9. The method of claim 8, wherein the vehicle parameters comprise cabin temperature of the hybrid vehicle and a temperature set point of a climate control system of the hybrid vehicle.

10. The method of claim 9, further comprising not adjusting operation of the climate control system to reduce its electrical load on the batteries of the hybrid vehicle when the temperature set point is greater than a determined amount above or below the cabin temperature of the hybrid vehicle.

11. The method of claim 1, wherein adjusting operation of an accessory of the hybrid vehicle to reduce the electrical load of that accessory on the batteries of the hybrid vehicle when the drive request value is above a determined drive request threshold amount and the electrical loading on batteries of the hybrid vehicle is above a power loading threshold, comprises only adjusting the operation of an accessory of the hybrid vehicle when the drive request value is above a determined drive request threshold amount for a predetermined period of time.

12. A system for controlling a hybrid powertrain of a hybrid vehicle comprising, comprising:
   a processor; and
   a memory coupled to the processor to store instructions, which when executed by the processor, cause the processor to perform operations, the operations comprising:
      determining a value of a drive request for a combustion engine of the hybrid vehicle;
      determining electrical loading on batteries of the hybrid vehicle;
      adjusting operation of an accessory of the hybrid vehicle to reduce the electrical load of that accessory on the batteries of the hybrid vehicle when the drive request value is above a determined drive request threshold amount and the electrical loading on batteries of the hybrid vehicle is above a power loading threshold; and
      directing at least some of the power saved by adjusting operation of the accessory from the batteries of the hybrid vehicle to a drive motor of the hybrid vehicle to provide motive force for the vehicle.

13. The system of claim 12, wherein the drive request comprises at least one of a throttle request, a drive force request and a torque request.

14. The system of claim 12, wherein adjusting operation of the accessory comprises inhibiting operation of a compressor, a thermoelectric heating or cooling element or a resistive heating element of a climate control system of the vehicle.

15. The system of claim 14, wherein the operations further comprise maintaining a blower motor speed of the climate control at a level corresponding to a user setting for the blower motor speed.

16. The system of claim 12, wherein the power loading threshold is determined based on an amount of power intended to be directed to the drive motor of the hybrid vehicle to provide motive force for the hybrid vehicle.

17. The system of claim 16, wherein the power loading threshold is a dynamic threshold that varies based on the amount of power intended to be directed to the drive motor of the hybrid vehicle to provide motive force for the hybrid vehicle.

18. The system of claim 12, wherein the drive force threshold is determined based on an amount of noise caused by the combustion engine of the hybrid vehicle at a given drive force request level.

19. The system of claim 12, wherein the operations further comprise receiving sensor data indicating vehicle parameters and using the received sensor data to determine whether to adjust operation of an accessory of the hybrid vehicle.

20. The system of claim 19, wherein the vehicle parameters comprise cabin temperature of the hybrid vehicle and a temperature set point of a climate control system of the hybrid vehicle.

21. The system of claim 20, wherein the operations further comprise not adjusting operation of the climate control system to reduce its electrical load on the batteries of the hybrid vehicle when the temperature set point is greater than a determined amount above or below the cabin temperature of the hybrid vehicle.

22. The system of claim 12, wherein adjusting operation of an accessory of the hybrid vehicle to reduce the electrical load of that accessory on the batteries of the hybrid vehicle when the drive request value is above a determined drive request threshold amount and the electrical loading on batteries of the hybrid vehicle is above a power loading threshold, comprises only adjusting the operation of an accessory of the hybrid vehicle when the drive request value is above a determined drive request threshold amount for a predetermined period of time.

* * * * *